United States Patent Office 3,496,295
Patented Feb. 17, 1970

3,496,295
SIGNAL DISPLAY APPARATUS WITH MEANS TO CONTROL THE ILLUMINATION OF THE INDIVIDUAL SCALES
Karl-Friedrich Pohle, Reinheim, Germany, assignor to Fernseh GmbH, Darmstadt, Germany
Filed Dec. 20, 1966, Ser. No. 603,295
Claims priority, application Germany, Dec. 22, 1965, F 47,978
Int. Cl. H04n 5/72
U.S. Cl. 178—7.84                              9 Claims

ABSTRACT OF THE DISCLOSURE

A display arrangement in which one of two differentiable signals are applied to the input terminals of an indicator equipped with a display screen. A scale associated with the particular signal being displayed is illuminated through a control voltage derived as a function of a composite signal which, in turn, is derived from the two input signals. The signals are realized from a video signal which may be either color or monochrome. Depending upon whether or not the color synchronizing signal is present, the control signal causes one of the signals to be supplied to the indicator, as well as the illumination of the associated scale of the signal.

---

The present invention relates to a signal display apparatus and more particularly to an apparatus for displaying two signals which are successively supplied to an indicator and which are made visible on a screen of the indicator, each with an associated scale. The indicator may in particular be an oscilloscope.

When different signals, the images of which relate to different scales, have to be displayed in succession on a screen, one possibility would be to exchange the scale indicators by hand so that the signal on display at any one time is visible together with its associated scale. However such a method would be time-consuming and thus uneconomic.

Another possibility would be to have a plurality of scale indicators arranged movably in the region of the screen and to use a motor, the motor bringing into the operative position only the scale indicator associated with the displayed signal. Such an apparatus would involve a relatively large outlay and take up a comparatively large amount of space.

It is therefore a main object of this invention to provide an apparatus which will avoid the above disadvantages.

It is another object of this invention to provide an apparatus of the type mentioned which is comparatively simple in its structure and in operation.

It is a further object of the present invention to provide an apparatus of the type mentioned at which no parts have to be mechanically moved and hardly any additional space is required.

It is still another object of this invention to provide an apparatus of the type mentioned which enables the scale required at any given time to be automatically displayed.

It is still a further object of the present invention to provide an apparatus of the type mentioned with a circuit arrangement which prevents automatically any burning in of the electron beam in the oscilloscope tube.

In a preferred embodiment of the invention signals are automatically switched over and the required scale is automatically illuminated. The signals are derived from a predetermined video signal which may be either color or monochrome. Depending on whether or not the color synchronizing signal is present a control signal is produced, this signal both switching over the signals and controlling the illuminating means.

Figure 1:
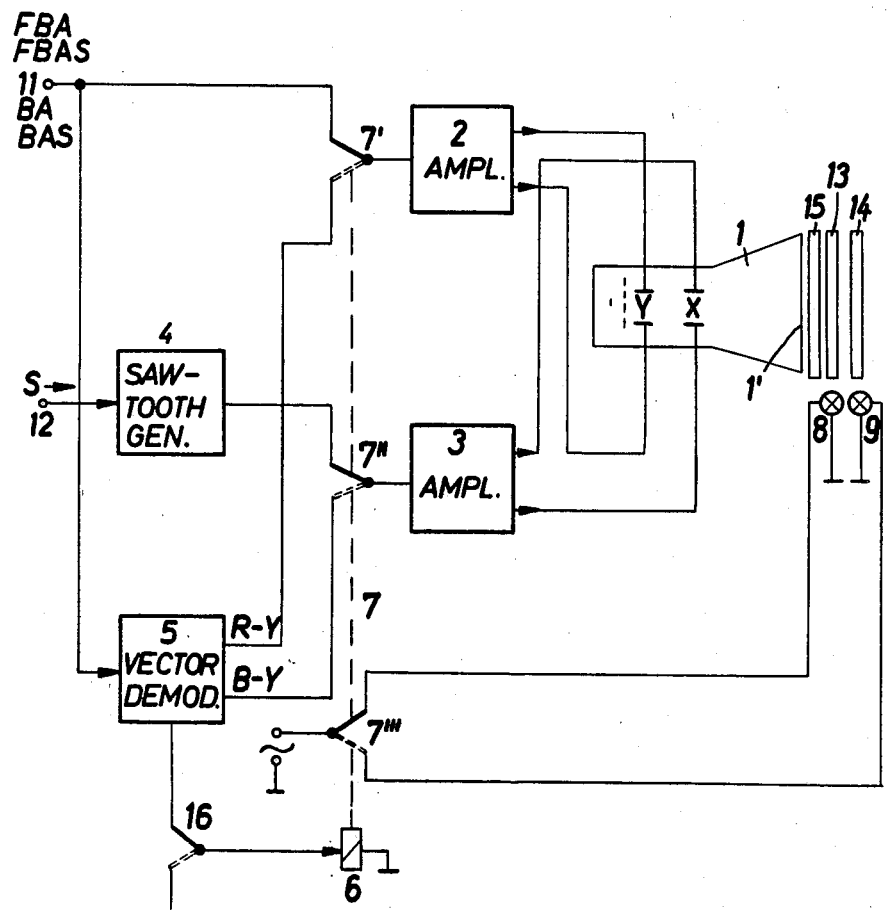
Figure 2:
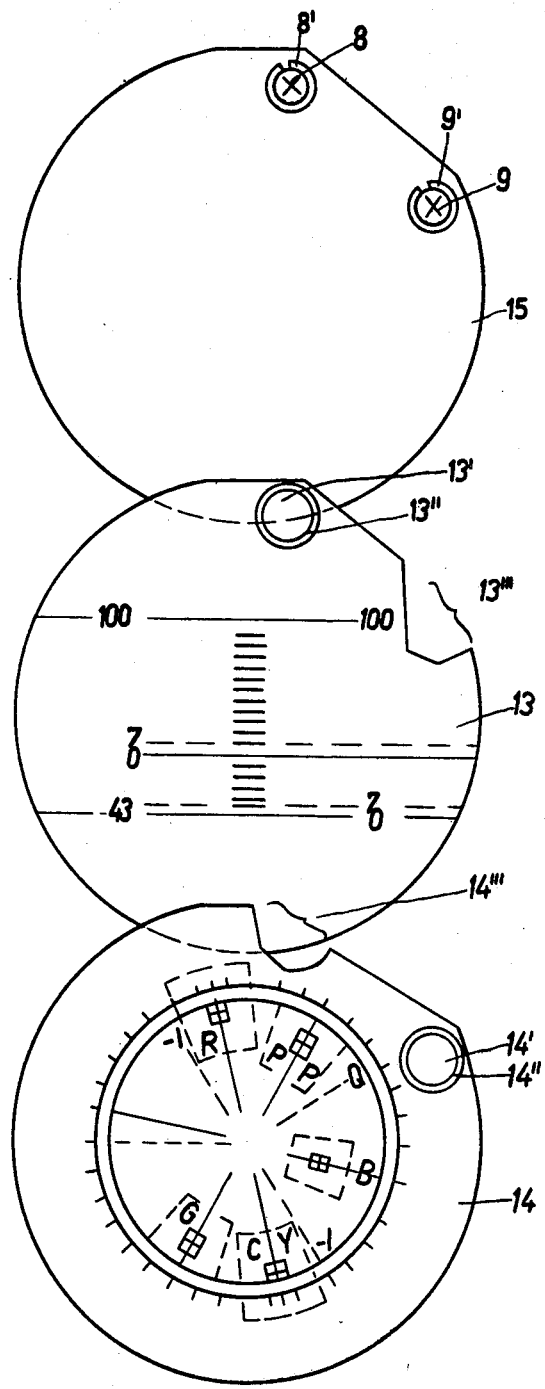

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 shows an oscilloscope circuit arrangement, and
FIG. 2 shows a means for illuminating two scales.

In both these drawings corresponding elements are designated by the same reference numerals.

The circuit arrangement in FIG. 1 comprises an oscilloscope tube 1, amplifiers 2, 3, a saw-tooth generator 4, a vector demodulator 5, a relay 6 and associated relay contacts 7, lamps 8, 9, and a switch 16. A video signal is supplied from terminal 11 and may consist of picture signal components and blanking signal components (BA signal, blanked video signal); of picture, blanking and synchronizing signal components (BAS signal, composite video signal); of color synchronizing picture and blanking signal components (FBA signal, blanked color video signal); or of color synchronizing, picture, blanking and synchronizing signal components (FBAS signal, composite color video signal).

It will first be assumed that a BA or a BAS signal is supplied. This video signal is led by way of the relay contact 7' (heavy-line position of switch) to the amplifier 2. The output of the amplifier 2 deflects the beam of the oscilloscope in the Y direction. A horizontal or vertical frequency synchronizing signal S is supplied from terminal 12. From it a series of saw-tooth pulses of the same frequency are generated in the saw-tooth generator 4 and led through relay contact 7" (heavy-line position) to the amplifier 3 which deflects the beam in the X direction. A curve of the video signal supplied is thus visible on the screen 1' of the cathode ray tube 1. The lamp 8 is additionally switched on by way of contact 7''' and the scale marked on a carrier 13 and associated with the received signal is illuminated.

If a FBA or a FBAS signal is supplied through terminal 11 instead of the BA or BAS signal, then the color difference signal R−Y or B−Y will be produced by the vector demodulator 5. In the vector demodulator 5 is a circuit arrangement generating a control voltage which assumes two different values depending on whether or not a color synchronizing signal F is present. The circuit arrangement is known as a "color killer." In the heavy-line position of the switch 16 the control voltage makes the relay 6 respond, causing the contacts 7', 7", 7''' to adopt the dotted-line positions. In this way the color difference signals R−Y and B−Y are led to the amplifiers 2 and 3 and displayed on the screen 1'. The lamp 9 is simultaneously switched on through contact 7''' (in the dotted-line position), causing the scale on the carrier 14 associated with the displayed signal to be illuminated.

If a monchrome video signal (BA of BAS signal) is supplied through the terminal 11 instead of the color video signal (FBA or FBAS signal), then the modified control voltage will be emitted by the vector demodulator 5 and will cause the contacts 7', 7", 7''' to adopt the full-line positions as initially described.

A monochrome video signal in the form of a transmission level trace, and a color video signal in the form of a vector trace, are thus successively made visible on the screen 1'. An observer will see the signal shown from screen 1' and its associated scale, while the other scale will not be illuminated and so will be hardly visible. Between the screen 1' and the carrier 13 is a filter 15 which enables the signals to be observed in comfort.

Automatic changing of the signals is desirable firstly because there is no point in showing a vector trace on the screen 1' unless a FBA or FBAS signal is present, while there is no point in showing the transmission level trace unless a BA or BAS signal is present. Secondly the change of signal (using the relay 6 and contacts 7) prevents any burning-in of the electron beam in the oscilloscope tube 1, which might occur if a BA or BAS signal were exhibited as a vector trace. The circuit arranged according to the invention thus has the additional advantage of giving protection against the poisoning of the screen of the oscilloscope tube.

So far a first method of operating the circuit arrangement in FIG. 1 has been described, in which the switch 16 assumes the heavy-line position and the relay 6 automatically changes over the signals. Apart from this first method a second mode of operation is possible wherein the switch 16 adopts the dotted-line position. In this position the relay 6 remains deenergised (no control voltage is fed to it) so that the contacts 7', 7", 7''' permanently assume the heavy-line position. It is therefore possible for FBA or FBAS signals led in through terminals 11 to be made visible on the screen 1' in the form of a transmission level trace.

FIG. 2 shows the carriers 13, 14 and the filter 15 in greater detail. Diverging slightly from the theoretical representation in FIG. 1, the two lamps 8 and 9 are fitted in a green filter 15 in suitable mounts 8' and 9'. The carriers 13 and 14 have been arranged one below the other for the sake of clarity but in the assembled condition the apertures 13' and 14' are in the region of the lamps 8 and 9. When the carriers are assembled the lamp 8 is thus surrounded by a red ring filter 13" so that when it is lit the inside of the transparent carrier 13 will be lit up, thus making the scale on it visible. In the case of a gauging operation the scale enables the transmission to be measured with the aid of the calibrating lines shown, without any interference from the scale on carrier 14. The calibrating lines are engraved into the carriers 13 and 14. When the lamp 9 is lit the vector scale on the carrier 14 is illuminated through a yellow ring filter 14" so that the position of the spot can be assessed by means of the zones of tolerance shown. The scale on carrier 13, which is present and behind the carrier 14 but not illuminated, does not interfere in any way. If both scales were to be engraved on a single carrier it would be impossible to obtain a clear view of either of them and there would be no satisfactory way of working with them.

The light from lamps 8 and 9 is effective substantially only within the carriers 13 and 14. To prevent the light from lamp 9 from radiating inside the carrier 13, the marginal area in the region of the aperture 13''' is provided with a reflective coating. The marginal area in the region of the aperture 14''' is similarly provided with a reflective coating to prevent the light from lamp 8 from illuminating the inside of the carrier 14. In addition, the entire cylindrical edge face of the carriers 13 and 14 is similarly coated in order to distribute the light radiated by lamps 8 and 9 evenly over the whole area of the carriers 13 and 14.

While the principles of the present invention have been described above in connection with specific apparatus, it is to be clearly understood that this description is made only by way of example and not as limitation to the scope of the invention as set forth in the objects thereof and in the accompanying claims.

What is claimed as new and desired to be secured by Letters Patent is:

1. Signal display apparatus comprising in combination an indicator having signal inlets and a display screen; switch means for supplying to said inlets at any one time one of two differentiable input signals; means adjacent to the screen for displaying at any one time one of two scales in conjunction with the signal displayed at that time; means responsive to said input signals for controlling said switch means and said display means in dependence on the existing input signal; means for illuminating the scale associated with the signal being displayed at any one time far more brightly than the other scale associated with the signal not being displayed at that time; said two signals being derived from a composite signal, and a control voltage being derived in dependence on the form of the composite signals; said control voltage causing one of said signals to be supplied to said indicator and causing the scale associated with the signal then supplied to be illuminated.

2. Signal display apparatus claimed in claim 1, in which the two signals are derived from a video signal having picture signal components, said control voltage assuming one value when said video signal has picture signal components only and said video signal assuming another value when said video signal has picture signal components and color synchronizing signal components.

3. Signal display apparatus comprising in combination an indicator having signal inlets and a display screen; switch means for supplying to said inlets at any one time one of two differentiable input signals; means adjacent to the screen for displaying at any one time one of two scales in conjunction with the signal displayed at that time; and means responsive to said input signals for controlling said switch means and said display means in dependence on the existing input signal; means for illuminating the scale associated with the signal being displayed at any one time far more brightly than the other scale associated with the signal not being displayed at that time; each of said two scales being in the form of calibrations on a transparent carrier; said carriers are arranged one behind the other in front of said display screen, and the light from said two lamps being radiated substantially within said carriers; each of said two carriers containing an aperture outside said scales; said lamps being each arranged in one of said apertures; said apertures being edged with filter plates of different colors, so that said scales are illuminated in light of different colors; said two signals being derived from a video signal having picture signal components; a control voltage being derived in dependence on the form of the video signal; said control voltage assuming one value when said video signal has picture signal components only and said video signal assuming another value when said video signal has picture signal components and color synchronizing signal components; in the absence of color synchronizing signal components said control voltage causes displays of a signal in the form of a level trace with its associated scale, whereas if color synchronizing signal components are present the control voltage causes display of color difference signal in the form of a vector trace with its associated scale.

4. Signal display apparatus comprising in combination an indicator having signal inlets and a display screen; switch means for supplying to said inlets at any one time one of two differentiable input signals; means adjacent to the screen for displaying at any one time one of two scales in conjunction with the signal displayed at that time, and means responsive to said input signals for controlling said switch means and said display means in dependence on the existing input signals; said two signals being derived from a composite signal, and a control voltage being derived in dependence on the form of the composite signal; said control voltage causing one of said signals to be supplied to said indicator and causing the scale associated with the signal then supplied to be displayed.

5. Signal display apparatus comprising in combination an indicator having signal inlets and a display screen; switch means for supplying to said inlets at any one time one of two differentiable input signals; means adjacent to the screen for displaying at any one time one of two scales in conjunction with the signal displayed at that time; means responsive to said input signals for controlling said switch means and said display means in dependence on the existing input signal; said two signals being derived from a composite signal, and a control voltage being derived in dependence on the form of the composite signal; said control voltage causing one of said signals to be supplied to said indicator and causing the scale associated with the signal then supplied to be displayed; and means for illuminating the scale associated with the signal being displayed at any one time far more brightly than the other scale associated with the signal not being displayed at that time.

6. Signal display apparatus claimed in claim 5, in which said means for illuminating consisting of two lamps associated with each of said two scales, and in which switch means in the circuits feeding said two lamps are coupled to said switch means.

7. Signal display apparatus comprising in combination an indicator having signal inlets and a display screen; switch means for supplying to said inlets at any one time one of two differentiable input signals; means adjacent to the screen for displaying at any one time one of two scales in conjunction with the signal displayed at that time; means responsive to said input signals for controlling said switch means and said display means in dependence on the existing input signal; said two signals being derived from a composite signal, and a control voltage being derived in dependence on the form of the composite signal; said control voltage causing one of said signals to be supplied to said indicator and causing the scale associated with the signal then supplied to be displayed; means for illuminating the scale associated with the signal being displayed at any one time far more brightly than the other scale associated with the signal not being displayed at that time; each of said two scales being in the form of calibrations on a transparent carrier; said carriers are arranged one behind the other in front of said display screen, and the light from said two lamps being radiated substantially within said carriers.

8. Signal display apparatus comprising in combination an indicator having signal inlets and a display screen, switch means for supplying to said inlets at any one time one of two differentiable input signals; means adjacent to the screen for displaying at any one time one of two scales in conjunction with the signal displayed at that time; means responsive to said input signals for controlling said switch means and said display means in dependence on the existing input signal; said two signals being derived from a composite signal, and a control voltage being derived in dependence on the form of the composite signal; said control voltage causing one of said signals to be supplied to said indicator and causing the scale associated with the signal then supplied to be displayed; means for illuminating the scale associated with the signal being displayed at any one time far more brightly than the other scale associated with the signal not being displayed at that time; each of said two scales being in the form of calibrations on a transparent carrier; said carriers are arranged one behind the other in front of said display screen, and the light from said two lamps being radiated substantially within said carrier; each of said two carriers containing an aperture outside said scales, and said lamps being arranged in one of said apertures.

9. Signal display apparatus claimed in claim 8, in which said apertures in said two carriers being edged with filter plates of different colors, so that said scales are illustrated in light of different colors.

References Cited

UNITED STATES PATENTS

| | | | |
|---|---|---|---|
| 2,446,674 | 8/1948 | Sproul | 178—7.84 |
| 3,281,861 | 10/1966 | Simopoulos | 346—110 |
| 3,303,273 | 2/1967 | Williams | 178—7.86 |

FOREIGN PATENTS

| | | |
|---|---|---|
| 601,055 | 4/1948 | Great Britain. |

ROBERT L. GRIFFIN, Primary Examiner

JOSEPH A. ORSINO, Jr., Assistant Examiner

U.S. Cl. X.R.

178—7.86